United States Patent [19]

Hoshino

[11] Patent Number: 4,626,125
[45] Date of Patent: Dec. 2, 1986

[54] LOCK PIN MECHANISM

[75] Inventor: Yoshihiro Hoshino, Nagoya, Japan

[73] Assignee: Hoshino Gakki Co., Ltd., Japan

[21] Appl. No.: 809,944

[22] Filed: Dec. 17, 1985

[51] Int. Cl.[4] .......................... B25G 3/18; F16B 21/00
[52] U.S. Cl. ..................................... 403/324; 403/325
[58] Field of Search ................ 403/324, 327, 325, 328

[56] References Cited

U.S. PATENT DOCUMENTS

| 1,099,758 | 6/1914 | Nichols | 403/327 |
| 1,408,530 | 3/1922 | Pierce | 403/324 |
| 1,833,236 | 11/1931 | Smith | 403/327 X |
| 4,518,002 | 5/1985 | Battiston, Sr. et al. | 403/328 X |

Primary Examiner—Andrew V. Kundrat
Attorney, Agent, or Firm—Ostrolenk, Faber, Gerb & Soffen

[57] ABSTRACT

A lock pin assembly for a collar bracket which is capable of engaging and releasing a member to be fixed. The lock pin is generally of cylindrical shape having, at one end, a neck portion of a small diameter, a pair of parallel excisions adjacent to the neck portion, the boundary between the neck portion and the excisions forming a shoulder, and, at the opposite end, a tapered tip. The collar bracket is provided with a pair of outwardly extending flanges, each having a hole for housing a pair of respective lock pins in opposite orientation. The lock pins are freely rotatable in the flange holes and are biased rearward by springs. A plate with a U-shaped cut-out is provided adjacent each flange for engaging the shoulder of each respective lock pin when the lock pin is moved forward against its bias and then rotated. When the lock pin is moved inward and rotated to such position, its tapered tip engages the member to be fixed.

8 Claims, 6 Drawing Figures

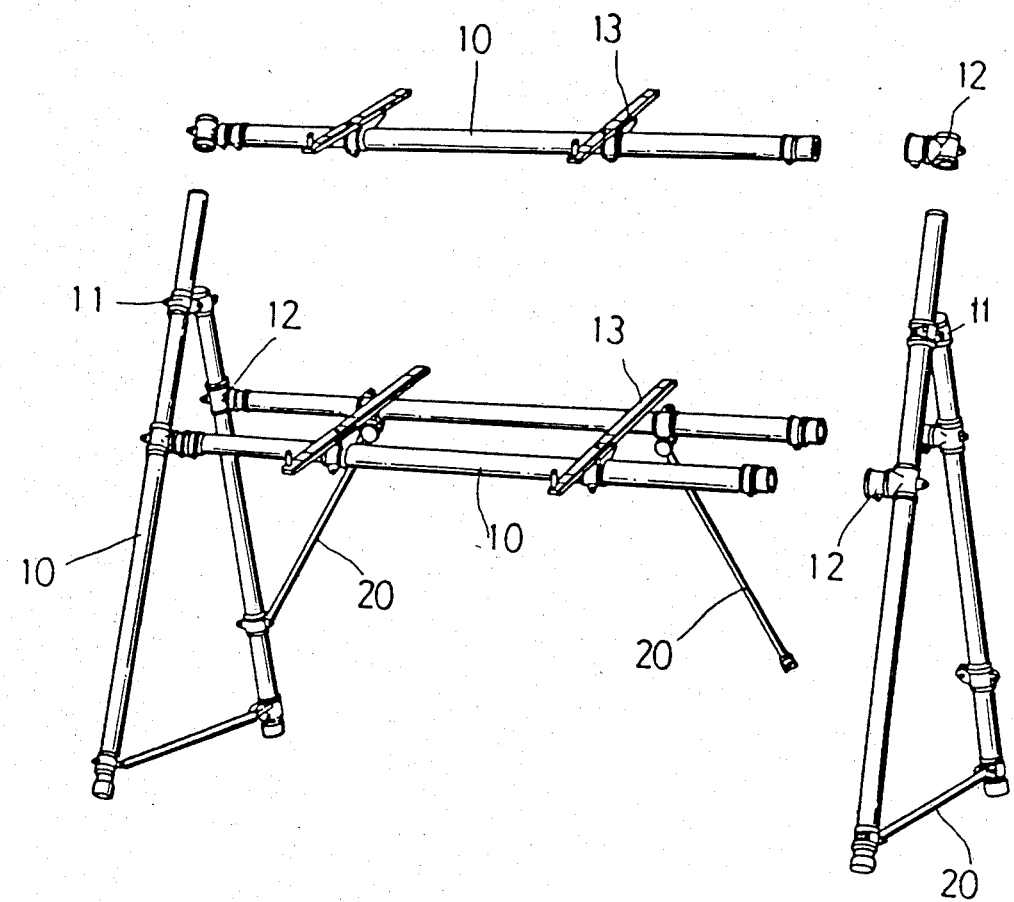

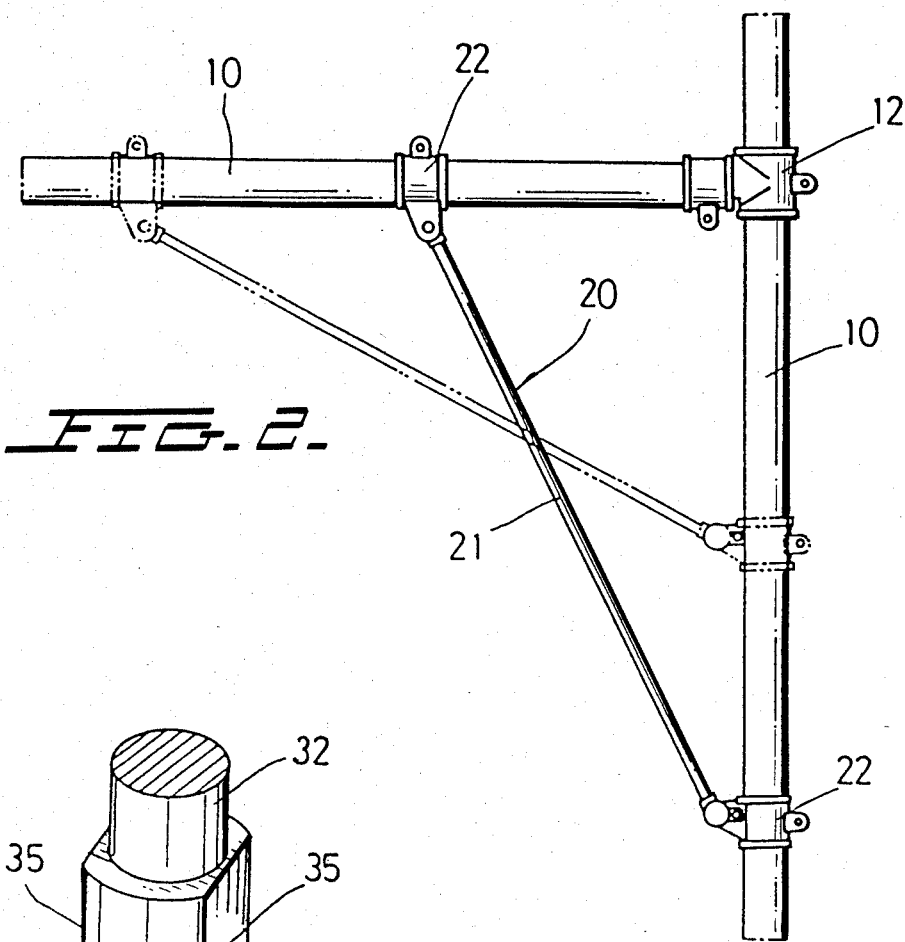
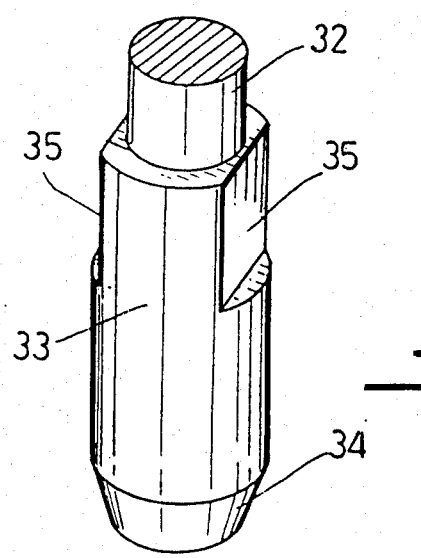

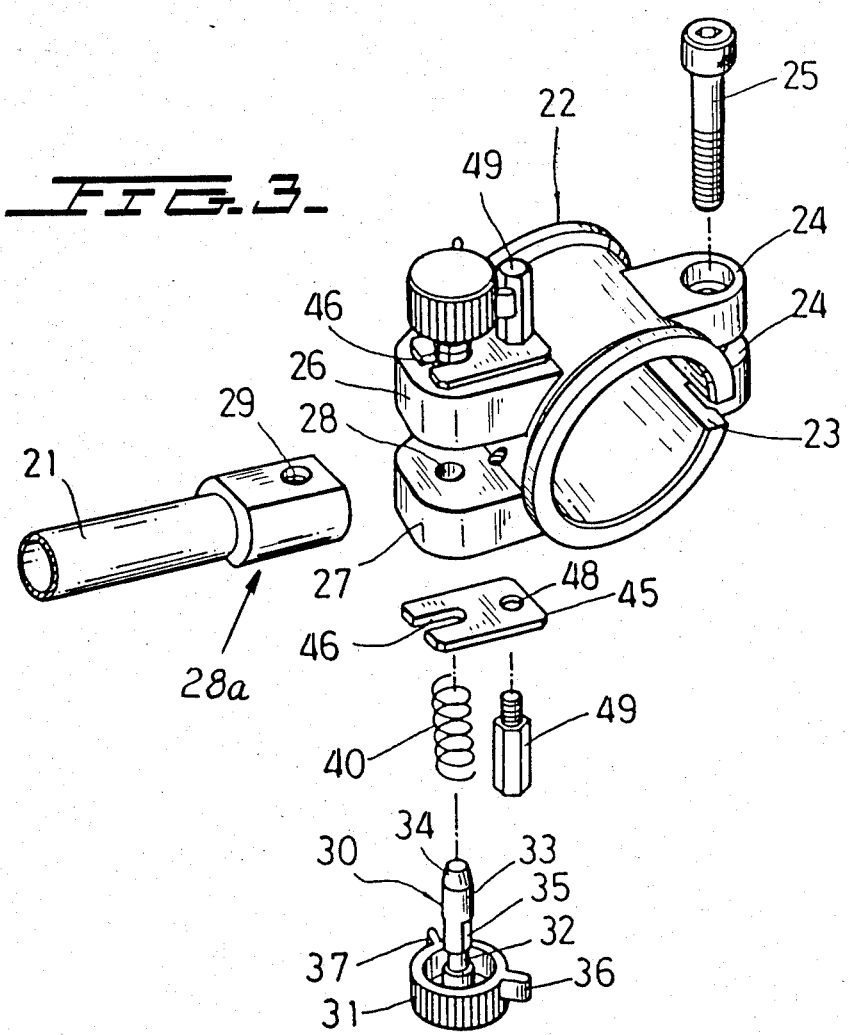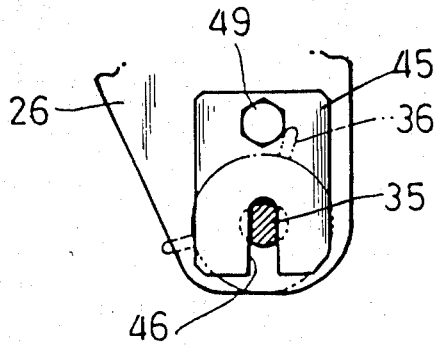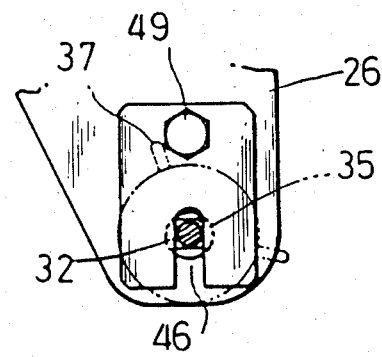

LOCK PIN MECHANISM

BACKGROUND OF THE INVENTION

The present invention relates to a lock pin assembly, and more particularly to a lock pin which is freely rotatable and which may engage or release a member to be fixed by the insertion or withdrawal of the tip portion of the lock pin into a hole in the member to be fixed.

In a stand which consists of a plurality of tubular members, such as the musical instrument stand shown in FIG. 1, it is necessary to provide a reinforcing member for the assembly. It is desirable that the reinforcing member be easily and simply installed or detached to facilitate assembly and dismantling of the stand. The lock pin assembly of the present invention provides this feature.

SUMMARY OF THE INVENTION

In accordance with the present invention, a lock pin assembly is provided on a collar bracket which is capable of engaging and releasing a member to be fixed through the rotation of the lock pin. The lock pin has a neck portion of a small diameter, a pair of parallel excisions adjacent to the neck portion, the boundary between the neck portion and the excisions forming a shoulder, and a tip portion of decreasing diameter at the opposite end of the lock pin. The tip portion of the lock pin is inserted into an engagement hole in the member to be fixed. The lock pin is freely rotatable in an aperture provided in the collar bracket. The collar bracket includes a plate with a U-shaped cut-out portion which cooperates with the shoulder of the lock pin to lock the lock pin in the engage position. The lock pin is biased rearwardly in the disengage position by a spring in the bracket. The lock pin is moved from the engage to the disengage position by appropriate rotation so that the parallel excisions of the lock pin line up with the cut-out portion of the plate, thereby releasing the shoulder and allowing the lock pin to move rearwardly.

Other features of the invention will be apparent from the following description of a preferred embodiment of the invention considered with reference to the accompanying drawings.

BRIEF DESCRIPTION OF THE DRAWINGS

FIG. 1 is an oblique view of a dismantled stand structure in which the present invention may be used.

FIG. 2 is an enlarged oblique view of a reinforcing member of the stand shown in FIG. 1.

FIG. 3 is an oblique exploded view, showing the lock pin assembly dismantled and showing the end part of the reinforcement rod to be fixed.

FIG. 4 is an oblique view of the lock pin with its head knob removed.

FIG. 5 is a cross section of the lock pin assembly in the released position.

FIG. 6 is a cross section of the lock pin assembly in the locked position.

DETAILED DESCRIPTION OF THE PREFERRED EMBODIMENT

The stand structure shown in FIG. 1 may be used as a stand for a musical instrument such as a keyboard. The stand has been constructed so as to be easily assembled and dismantled for stage performance.

As shown in FIG. 1, the stand comprises tubular members 10, a respective bracket 11 for each of the pairs of the legs of the stand, connective brackets 12 for coupling horizontal ones of the tubular members to the leg portion of the stand, sliders 13 for holding items, and at least one reinforcement rod member 20.

As previously mentioned, the lock pin assembly of the present invention may be utilized for securing and releasing the reinforcement rod member 20 to the stand structure. Obviously, however, the lock pin assembly of the present invention may also be utilized in a wide variety of other applications; i.e., the invention may be used for joining to any type of structure, not related to musical instruments, supports or stands. In the following discussion, the reinforcement rod member is used as an example of a member to be fixed by the lock pin.

Referring now to FIG. 2, the reinforcing rod member 20 is used as a brace for the reinforcement of two tubular members 10, which have been connected at a right angle by a bracket 12. Reinforcing rod member 20 comprises a reinforcing rod 21 and a respective collar bracket 22 for securing each end of the reinforcing rod 21 to the respective tubular members 10. In the example shown, the collar bracket 22 is fixed to tubular member 10, and rod 21 is the member to be fixed to collar bracket 22.

Referring now to FIG. 3, collar bracket 22 is, broadly, a split ring, split at opening 23, with aligned flanges 24 provided on both sides of opening 23. Flanges 24 are drawn together by a tightening bolt 25 to securely fix collar bracket 22 to any given location along tubular member 10.

On the opposite side of the collar bracket 22 from opening 23, a pair of lock pins 30 are held opposed to and movable toward each other, freely rotatable in respective fixing flanges 26 and 27 for the engagement of reinforcing rod 21.

Reinforcing rod 21 terminates in a widened end piece 28a with opposite flats that seat loosely against flanges 26 and 27. An engagement hole 29 extends through end piece 28a which can be disposed between flanges 26 and 27 of the collar bracket, and the lock pins 30 can extend into both ends of the engagement hole 29.

As is evident from FIG. 4, lock pin 30 includes a neck portion 32, a main body 33, and a shoulder therebetween. The neck portion 32 has a diameter which is smaller than that of the main body 33. The main body 33 has a tapered end 34 which is inserted into engagement hole 29 of reinforcing rod 21 for engaging the reinforcing rod 21. In addition, lock pin 30 has, on main body 33, adjacent to the shoulder, a pair of excisions 35 which form parallel flats on opposite sides of the lock pin.

As shown in FIG. 3, a head knob 31 is attached to the neck portion 32 of lock pin 30. The lock pins 30 are held in freely rotatable manner in the holes 28 of respective flanges 26 and 27 of the collar bracket 22. The lock pin is rearwardly biased by means of a spring 40.

On the same side of collar bracket 22 as flanges 26 and 27, a respective plate 45 having a U-shaped cut-out portion 46 is provided. The lock pin may be moved forward through hole 28 when excisions 35 are lined up and coincide with notched cut-out portion 46 of the respective plate 45. Plate 45 also includes an installing hole 48 through which a bolt 49 extends to fasten plate 45 to the respective flange of collar bracket 22. Bolt 49 cooperates with abutments 36, 37 of head knob 31 of the lock pin to serve as a stop for the rotation of lock pin 30 as lock pin 30 is rotated from an engaged to released position.

FIGS. 5 and 6 are cross sectional views of the assembly with the head knob 31 of lock pin 30 removed. FIG. 5 shows pin 30 in engagement hole 29 of reinforcing rod 21. FIG. 6 shows lock pin 30 withdrawn from engagement hole 29 of reinforcing rod 21. As shown in FIGS. 5 and 6, the excisions 35 which are provided adjacent to the shoulder of the main body of lock pin 30 are shaped and sized to pass through cut-out part 46 of plate 45 when lock pin 30 is rotated to the appropriate position.

FIG. 5 shows the lock pin with the excisions 35 aligned with cut-out portion 46. Since lock pin 30 is biased rearward by the force of spring 40, it moves rearward so that tip 34 of lock pin 30 recedes from engagement hole 29 and reinforcing rod 21 is released.

FIG. 6 shows the engagement position of the assembly in which lock pin 30 has been pushed forward and rotated. As shown, excisions 35 are not aligned with cut-out portion 46. As a result, the shoulder of the lock pin is engaged by plate 45 to effect locking. In this position, tip 34 of lock pin 30 protrudes forward into engagement hole 29 to engage reinforcing rod 21.

Abutments 36 and 37 on head knob 31 of lock pin 30 limit the rotation of the lock pin between its engagement and release positions by the cooperation of abutments 36 and 37 with stopper bolt 49.

Accordingly, as is evident from the above description, the present invention allows the engagement and release of a member to be fixed in a simple and easy manner merely by the rotation and forward or rearward movement of a lock pin. As a result, the assembly or dismantling of an structure, such as a stand for a musical instrument as shown in the preferred embodiment, can be effected quickly and easily.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A lock pin assembly, comprising a stationary member, a member to be fixed, and a lock pin for releasably coupling said member to be fixed to said stationary member, said stationary member having at least one flange with an aperture therethrough; a plate having a cut-out portion positioned at said flange adjacent said aperture, said cut-out portion being defined between margins which define its width and serve as guides for said lock pin;

said lock pin having a cross section sized to fit into and rotate inside said aperture and being greater than the width of said cut-out portion, having at least one excision for reducing the cross section of the pin at the excision, having a neck portion adjacent said excision of a cross section less than or equal to said reduced cross section, the boundary between said neck portion and said excision forming a shoulder, and having a tip portion at the opposite end of the lock pin from said neck portion, said lock pin being positioned in said circular aperture and being longitudinally movable through said aperture between a forward position, wherein said tip portion of said lock pin engages said member to be fixed, and a rearward portion wherein said tip portion of said lock pin releases said member to be fixed;

said lock pin being freed for movement between said forward and rearward positions by rotation thereof such that said excision is aligned with the margin of said cut-out portion, said lock pin being locked in said forward position by rotation thereof such that said excision is not aligned with said cutout portion, said shoulder of said lock pin cooperating with said plate to thereby prevent longitudinal movement of said lock pin.

2. A lock pin assembly as recited in claim 1, wherein said lock pin has a substantially cylindrical shape and said aperture of said stationary member has a substantially circular shape.

3. A lock pin assembly as recited in claim 1, wherein said lock pin has a pair of excisions for reducing the cross section of the pin at said excisions.

4. A lock pin assembly as recited in claim 2, further comprising a spring which cooperates with said lock pin to bias said lock pin to its rearward position.

5. A lock pin assembly as recited in claim 4, further comprising a head knob positioned at the rearward end of said lock pin adjacent to said neck portion having a cross section substantially larger than that of said lock pin.

6. A lock pin assembly as recited in claim 5, wherein said plate is coupled to said stationary member by a bolt and said head knob of said lock pin has at least one abutment formed thereon, said bolt and said abutment cooperating to limit the rotation of said lock pin.

7. A lock pin assembly as recited in claim 6, wherein said member to be fixed has an aperture therethrough for receiving said tip portion of said lock pin.

8. A lock pin assembly as recited in claim 7, further comprising a pair of lock pins oriented in opposite directions in respective flanges of said stationary member, said tip portions of said respective lock pins engaging opposite sides of said aperture of said member to be fixed.

* * * * *